United States Patent
Bower, III et al.

(10) Patent No.: US 10,664,364 B2
(45) Date of Patent: May 26, 2020

(54) TRANSFERRING A SERVER CONFIGURATION PARAMETER ALONG WITH A WORKLOAD

(71) Applicant: Lenovo Enterprise Solutions (Singapore) Pte. Ltd., Singapore (SG)

(72) Inventors: Fred A. Bower, III, Durham, NC (US); Caihong Zhang, Shanghai (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 319 days.

(21) Appl. No.: 15/296,280

(22) Filed: Oct. 18, 2016

(65) Prior Publication Data

US 2018/0107569 A1 Apr. 19, 2018

(51) Int. Cl.
| G06F 11/20 | (2006.01) |
| H04L 29/08 | (2006.01) |
| H04L 29/14 | (2006.01) |
| H04L 12/24 | (2006.01) |

(52) U.S. Cl.
CPC ........ *G06F 11/2007* (2013.01); *G06F 11/203* (2013.01); *G06F 11/2038* (2013.01); *G06F 11/2048* (2013.01); *H04L 41/084* (2013.01); *H04L 67/1097* (2013.01); *H04L 67/34* (2013.01); *H04L 69/40* (2013.01); *G06F 2201/85* (2013.01); *H04L 41/0659* (2013.01); *H04L 41/0836* (2013.01)

(58) Field of Classification Search
CPC ............. G06F 11/2025; G06F 11/2033; G06F 11/2035; G06F 11/2046; G06F 11/2007; H04L 41/145; H04L 41/082; H04L 41/5003; H04L 43/0847
See application file for complete search history.

(56) References Cited

U.S. PATENT DOCUMENTS

| 6,763,479 B1* | 7/2004 | Hebert ................ G06F 11/2005 714/4.11 |
| 7,653,833 B1* | 1/2010 | Miller ................ G06F 11/2035 714/13 |
| 7,739,527 B2* | 6/2010 | Rothman .............. G06F 1/3203 713/320 |
| 7,774,785 B2* | 8/2010 | Hartung ............... G06F 3/0607 717/168 |
| 9,323,628 B2* | 4/2016 | Ngo .................... H04L 67/1008 |
| 9,398,092 B1* | 7/2016 | Singhal ............... H04L 67/1097 |
| 9,424,148 B2* | 8/2016 | Brundridge ......... G06F 11/2025 |
| 9,501,544 B1* | 11/2016 | Singhal ................... G06F 11/00 |
| 2007/0226333 A1* | 9/2007 | Morich ............... G06F 11/0709 709/224 |
| 2013/0344965 A1* | 12/2013 | Dale ................... H04L 67/1002 463/42 |
| 2015/0113313 A1* | 4/2015 | Chen ................... G06F 11/2007 714/4.11 |
| 2016/0308774 A1* | 10/2016 | Astigarraga ............ H04L 47/25 |
| 2018/0054475 A1* | 2/2018 | Agarwal ............. H04L 67/1002 |

* cited by examiner

*Primary Examiner* — Nadeem Iqbal
(74) *Attorney, Agent, or Firm* — Jeffrey Streets (57) ABSTRACT

A method includes migrating a workload from a first server to a second server, wherein the first and second servers are within a management network. The method further includes transferring one or more configuration parameter(s) from the first server to the second server, wherein the one or more parameter(s) enables continued performance of the workload on the second server.

20 Claims, 5 Drawing Sheets

TRANSFERRING A SERVER CONFIGURATION PARAMETER ALONG WITH A WORKLOAD

BACKGROUND

Field of the Invention

The present invention relates to methods of configuring a computer for a workload.

Background of the Related Art

A computer system may include any number of servers that run workloads, such as an instance of an application program. Although several of the servers may have sufficient individual hardware capacity and performance to run a given workload, the workload must be run on a server that has been appropriately configured for the workload. While it may be a simple matter to configure a single server to meet the requirements of a given workload, it can be a challenge to consistently provide an appropriate server configuration in a virtualized or non-virtualized operating environment where an external workload controller may migrate a workload from one server to another server at any time, perhaps due a server failover or system performance optimization. For example, network resources that a server makes available to a workload are typically linked to configuration information and settings, such that a workload depends upon a consistent configuration when being migrated to a different server. Manual configuration of each server is the simplest method for achieve a consistent configuration for a workload, but this requires careful administration to be effective and avoid mistakes.

BRIEF SUMMARY

One embodiment of the present invention provides a method comprising migrating a workload from a first server to a second server, wherein the first and second servers are within a management network, and transferring one or more parameters of a configuration from the first server to the second server, wherein the one or more parameters enable continued performance of the workload on the second server.

Another embodiment of the present invention provides a computer program product comprising a non-transitory computer readable storage medium having program instructions embodied therewith, wherein the program instructions are executable by a processor to cause the processor to perform a method. The method comprises migrating a workload from a first server to a second server, wherein the first and second servers are within a management network, and transferring one or more parameters of a configuration from the first server to the second server, wherein the one or more parameters enable continued performance of the workload on the second server.

DETAILED DESCRIPTION

One embodiment of the present invention provides a method comprising migrating a workload from a first server to a second server, wherein the first and second servers are within a management network, and transferring one or more parameter(s) of a configuration from the first server to the second server, wherein the one or more parameter(s) enable continued performance of the workload on the second server.

The workload may be an instance of any application or task that is executed by a server. A server may execute or run one or more workloads (instances of applications or tasks), whether or not the workloads are virtualized. Each workload may have one or more hardware requirements, including one or more configuration parameters that are needed to enable the workload to be performed or support a desired performance of the workload. For example, the one or more parameter(s) may include a virtual address, such as an Ethernet media access control (MAC) address or a fiber channel world-wide name (WWN), or a storage adapter parameter for providing connectivity to a storage area network (SAN). However, the one or more parameter(s) may be any single parameter or any combination of parameters that affect the performance of a workload. A server may store an association between a workload and one or more configuration parameters that should be used by any server that is performing the workload.

In a hypothetical example, a workload to be transferred only carries affinity to a subset of the host hardware configuration. If that workload only requires connectivity to a storage area network (SAN), then the first server may transfer the workload and only that portion of the configuration that affects the storage adapter. In this situation, the first server may, for example, leave its Ethernet configuration unaffected. If the first server runs multiple workloads that each have unique configuration elements, each of the workloads and their unique configuration parameters may be transferred independently of other configuration parameters.

The workload migration and transfer of the one or more parameters of the configuration may occur in response to manual input from a system administrator, failure of the first server or a component of the first server, or input from a workload management system, such as a hypervisor. A system administrator may manually initiate migration of a workload at any time for a variety of reasons. However, a first server may store the identity of one or more predetermined servers to which workloads may be transferred in response to a failure of the first server. Accordingly, a workload may be automatically migrated to an identified server in response to failure of the first server or failure of a component of the first server that is critical to the performance of the workload. Furthermore, in a virtualized environment, a hypervisor may initiate migration of a workload at any time for a variety of purposes, such as managing workload performance or managing system power consumption. However, it should be appreciated that embodiments of the present invention enable migration of a workload from one server to another server (i.e., peer-to-peer migration) without the need for an external workload controller.

Embodiments of the method may further comprise sending a transfer request from the first server to the second server, and waiting for the first server to receive a response from the second server prior to migrating the workload and transferring the one or more parameters. Optionally, the first server may send the transfer request to the second server in response to detecting a predetermined condition, such as failure or reduced performance or capabilities of the first server. Furthermore, the second server may be predetermined as a failover target for the first server, or the second server may be just one of many servers receiving the transfer request from the first server.

In one option, the method may further comprise designating one or more servers within the management network as a candidate for receiving a workload from the first server, sending a transfer request from the first server to the one or more servers, receiving a response from at least one of the one or more servers, and selecting the second server from among the at least one of the one or more servers from which a response is received. In a first example, the first server may select a server associated with a first response to the transfer request, a server associated with a first response indicating that the responding server can satisfy the workload or priority requirement included in the transfer request, or a server that is identified as being a member of a designated hardware group within the management network. Selecting the server that is the first to respond may be most appropriate in a homogeneous system, since there the selection gives no consideration to other responding servers and potential differences in the capabilities of other responding servers. Selecting a server that is identified as being a member of a designated hardware group may be beneficial in systems that have multiple server pools existing within the same management network. Optionally, the servers within each server pool may have substantially similar or identical hardware.

Optionally, rather than selecting the second server from among the at least one of the one or more servers from which a response is received, the method may send the configuration parameters to each of the candidate servers from which a response is received. In any of these examples, the second server may authenticate the first server prior to sending a response, perhaps authenticating the first server using a digital signature in the transfer request. Any authentication methodology may be implemented depending upon the security level of the server pool. However, authentication may be used to ensure that a transfer respondent (server) will only respond to a valid transfer request from an authorized originator (server).

In one embodiment, the method may further comprise clearing the one or more parameters of the configuration from the first server in response to completing the transfer of the one or more parameter(s) of the configuration to the second server. For example, in an implementation where the first server transfer a workload to the second server along with a media access control address for the first server, the first server preferably will clear or delete the media access control address from the configuration parameters stored and used by the first server.

In another embodiment, the method may further comprise storing a record of the configuration transfer in a configuration database of the first server, wherein the record identifies the second server and the one or more parameters that were transferred to the second server. The record of the configuration transfer may be useful in some instances, such as if the second server migrates the workload back to the first server, or if the first server needs to migrate another instance of the workload at a later time.

Another embodiment of the present invention provides a computer program product comprising a non-transitory computer readable storage medium having program instructions embodied therewith, wherein the program instructions are executable by a processor to cause the processor to perform a method. The method comprises migrating a workload from a first server to a second server, wherein the first and second servers are within a management network, and transferring one or more parameters of a configuration from the first server to the second server, wherein the one or more parameters enable continued performance of the workload on the second server.

The foregoing computer program product may further include program instructions for implementing or initiating any one or more aspects of the methods described herein. Accordingly, a separate description of the methods will not be duplicated in the context of a computer program product.

Figure 1:
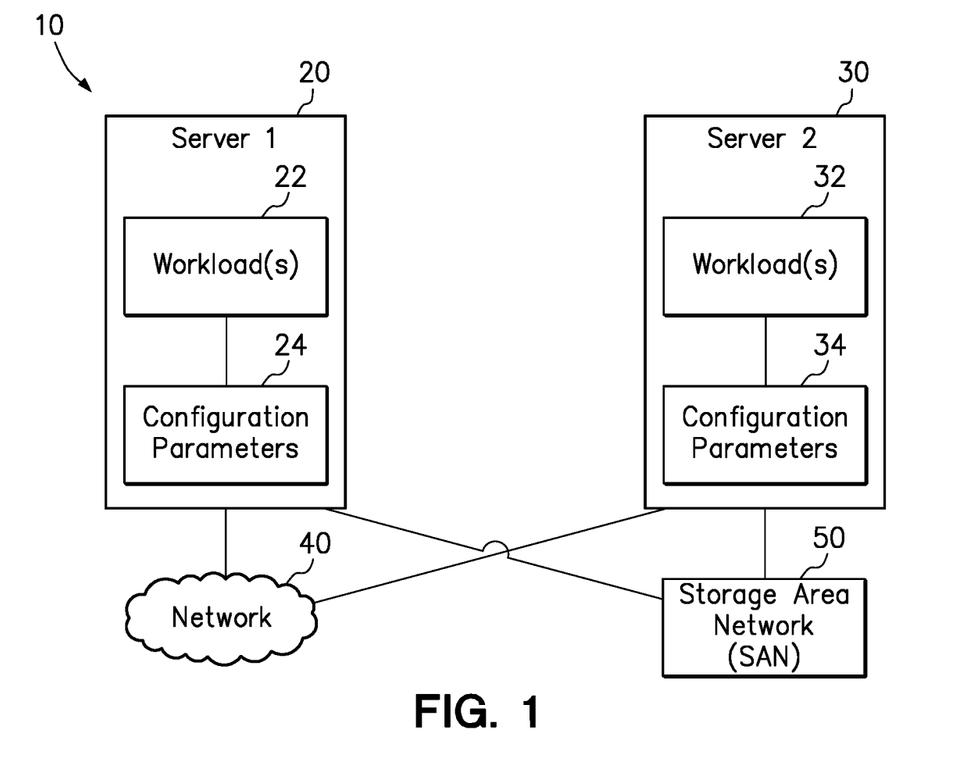
FIG. 1 is a diagram of a computer system including at least two servers.

FIG. 1 is a diagram of a computer system 10 including at least two servers 20, 30. A first server (Server 1) 20 runs one or more workloads 22 and has been configured using one or more configuration parameter(s) 24. Similarly, a second server (Server 2) 30 may or may not run one or more workloads 32 and may or may not be configured using one or more configuration parameter(s) 34. Optionally, each server 20, 30 may communicate with each other and/or with other device over a network 40, which may be a local area network (LAN) or a wide area network (WAN). Separately, each server 20, 30 may communicate with a storage area network (SAN) 50 for the storage and retrieval of files or data associated with the workloads being run by the respective server.

Figure 2:
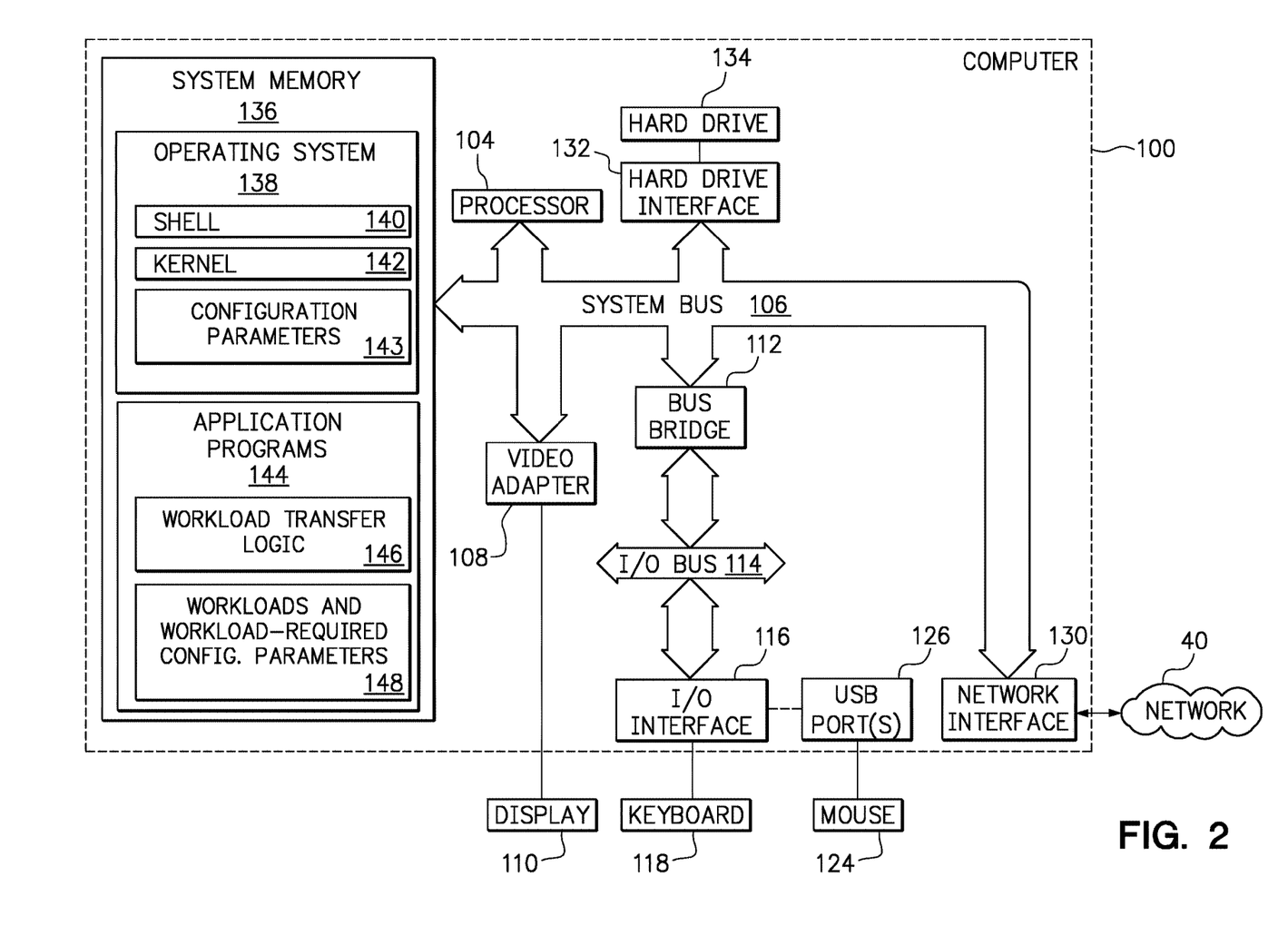
FIG. 2 is a diagram of a computer that is representative of a server according to one or more embodiment of the present invention.

FIG. 2 is a diagram of a computer 100 that is representative of either of the servers 20, 30 of FIG. 1, according to one embodiment of the present invention. The computer 100 includes a processor unit 104 that is coupled to a system bus 106. The processor unit 104 may utilize one or more processors, each of which has one or more processor cores. A video adapter 108, which drives/supports a display 110, is also coupled to system bus 106. The system bus 106 is coupled via a bus bridge 112 to an input/output (I/O) bus 114. An I/O interface 116 is coupled to the I/O bus 114. The I/O interface 116 affords communication with various I/O devices, including a keyboard 118, and a USB mouse 124 via USB port(s) 126. As depicted, the computer 100 is able to communicate with other network devices over the network 40 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory includes additional higher levels of volatile memory (not shown), including, but not limited to, cache memory, registers and buffers. Data that populates the system memory 136 includes the operating system (OS) 138 and application programs 144.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 may be a text-based, line-oriented user interface, the present invention may support other user interface modes, such as graphical, voice, gestural, etc.

As depicted, the operating system 138 also includes the kernel 142, which includes lower levels of functionality for the operating system 138, including providing essential services required by other parts of the operating system 138 and application programs 144. Such essential services may include memory management, process and task management, disk management, and mouse and keyboard management. The operating system 138 further includes various configuration parameters 143, such as an Ethernet media access control (MAC) address, a fiber channel world-wide name (WWN), or a storage adapter parameter for providing connectivity to a storage area network (SAN).

As shown, the computer 100 includes application programs 144 in the system memory of the computer 100, including, without limitation, the workload transfer logic 146, the workloads and workload-required configuration parameters 148. The workload transfer logic 146 may handle the workloads and workload-required configuration parameters 148 in order to implement one or more of the embodiments disclosed herein. Optionally, one or more aspect of the workload transfer logic 22 may be implemented as part of the operating system 138, rather than as one of the application programs 144.

The hardware elements depicted in the computer 100 are not intended to be exhaustive, but rather are representative. For instance, the computer 100 may include alternate memory storage devices such as magnetic cassettes, digital versatile disks (DVDs), Bernoulli cartridges, and the like. These and other variations are intended to be within the scope of the present invention.

Figure 3:
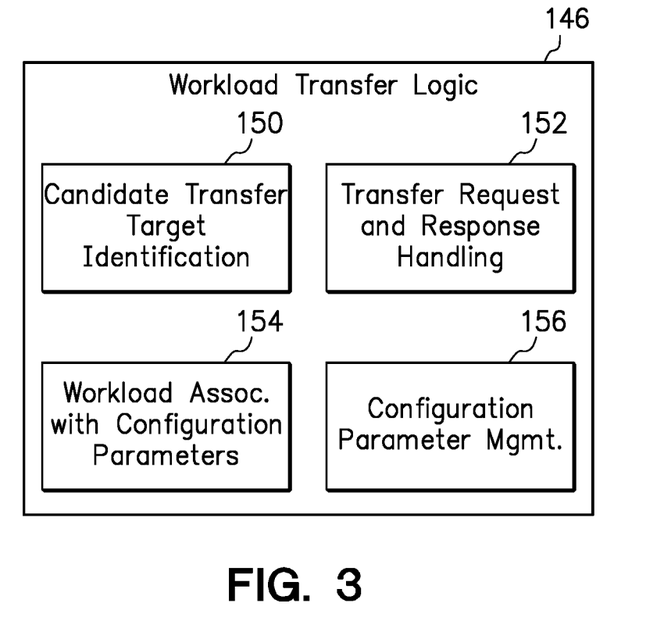
FIG. 3 is a diagram of various modules of workload transfer logic according to one embodiment of the present invention.

FIG. 3 is a diagram of various modules of the workload transfer logic 146 (see FIG. 2) according to one embodiment of the present invention. A first module 150 provides candidate transfer target identification. As the name suggested, module 150 identifies one or more servers as candidates to which the first server may transfer a workload and configuration parameters associated with the workload.

A second module 152 provides transfer request and response handling. For a first server that is preparing to migrate a workload to a second server, this module is responsible for generating and sending transfer requests, then receiving and analyzing responses from other servers. For a second server, this module is first responsible for preparing and sending a response, and then subsequently responsible for receiving the workload and associated configuration parameter(s). In optional embodiments, the module 152 may also take steps to authenticate the first server and/or determine that the second server has the capability to satisfy any performance requirements stated in the transfer request.

A third module 154 provides workload associations with configuration parameters. In other words, a server may maintain a list of all workloads running on the server and identify any configuration parameters that are required by, or otherwise associated with, each workload. In this manner, migration of a given workload will be accompanied by communication of the configuration parameters associated with that given workload. After a workload has been transferred to another server, the workload and associated configuration parameters may be removed from the list. Conversely, a workload and associated configuration parameters may be added to the list in response to the server receiving the workload.

A fourth module 156 provides configuration parameter management. This module is responsible for managing the configuration parameters associated with each workload and the server as a whole. The module may determine whether current configuration parameters for the server should be updated or changed in response to changes in the workloads being run on the server.

Figure 4:
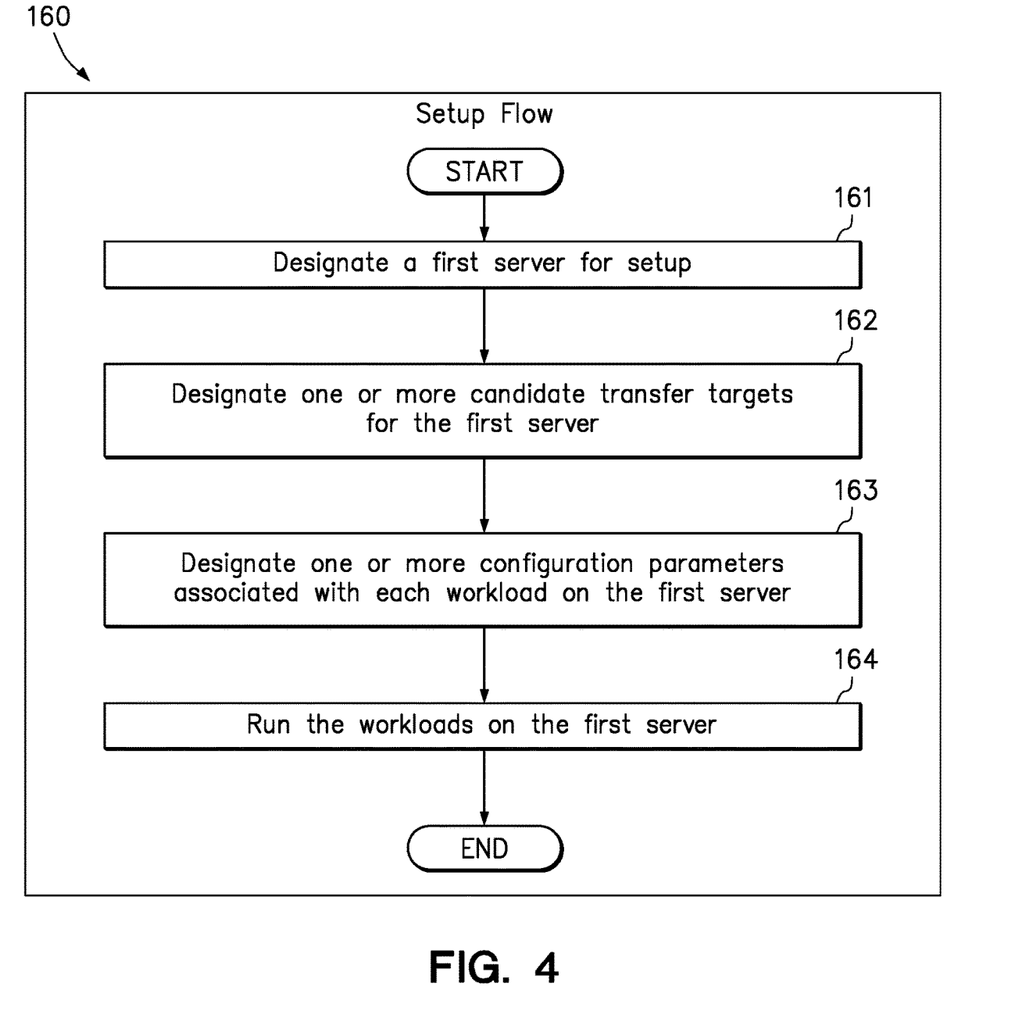
FIG. 4 is a flowchart of a method for setting up one or more transfer targets for a first server.

FIG. 4 is a flowchart of a method 160 for setting up a first server to implement an embodiment of the present invention. In step 161, the method designates a first server to be set up. During set up, an administrator may setup up each server to be prepared for transferring a workload. Step 162 designates or identifies one or more candidate transfer targets (servers) for the first server. These candidate transfer targets will be sent a transfer request when the first server determines that a workload should be transferred, and the first server will typically transfer the workload to one of the candidate transfer targets that responds to the transfer request. Step 163 designates one or more configuration parameters to be associated with each workload on the first server. This may be done manually or automatically each time a new workload is provisioned. In step 164, the method then runs the workloads on the first server.

Figure 5:
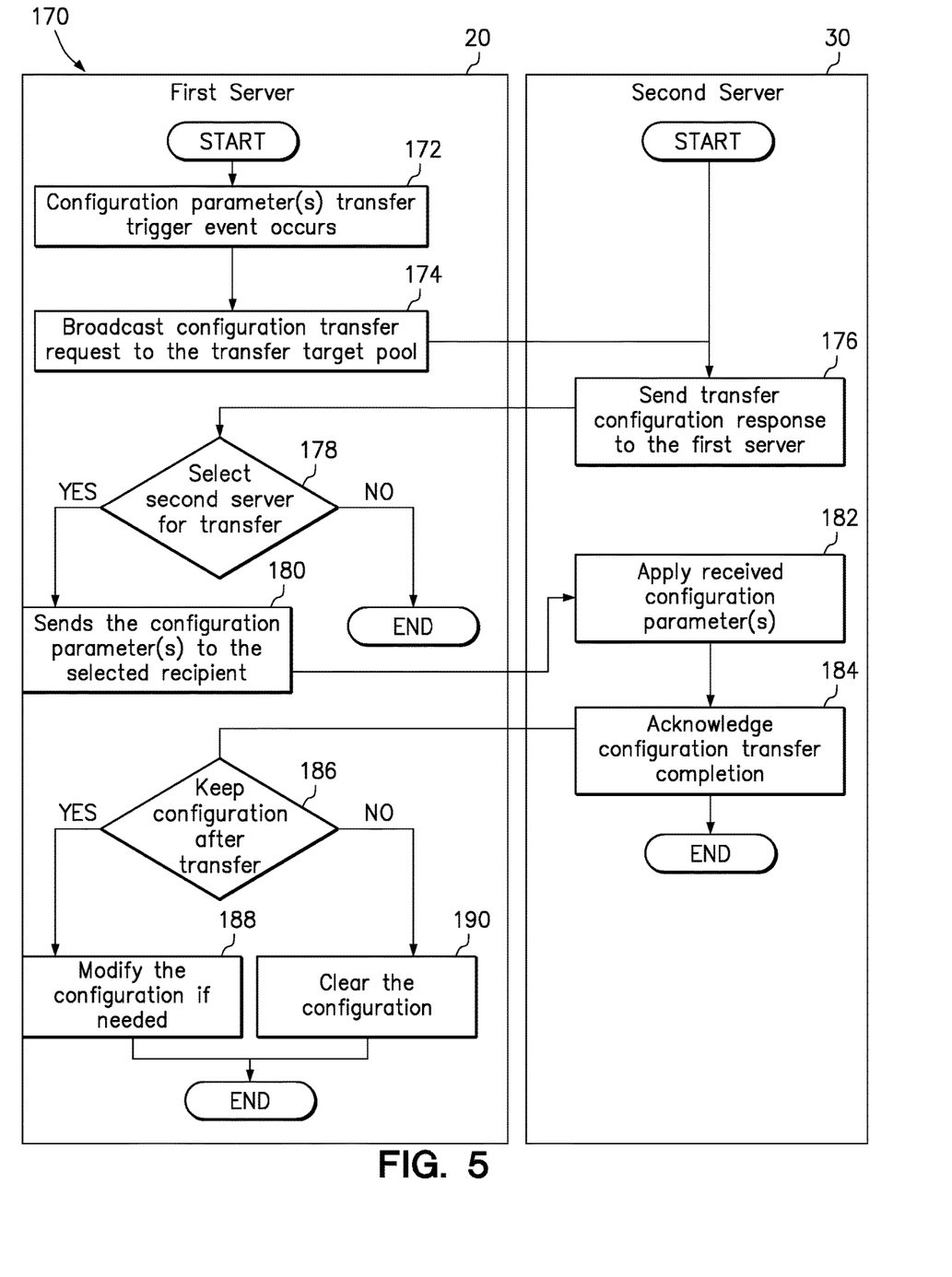
FIG. 5 is a flowchart of a method for transferring a configuration from a first server to second server.

FIG. 5 is a flowchart of a method 170 for transferring a configuration parameter from a first server to second server. An event triggering configuration transfer occurs in step 172 and the first server (20) broadcasts a configuration transfer request to servers in the pre-designated pool of candidate transfer targets in step 174. A second server (30) receives the transfer request from the first server and, in step 176, sends a transfer configuration response to the first server.

In step 178, the first server (20) may then select the second server (30) for transfer of the configuration parameter, as well as transfer of the workload. Then, in step 180, the first server sends the configuration parameter(s) associated with the workload to the second server. The second server then applies the received configuration parameter(s) in step 182, and sends an acknowledgement that the configuration parameter has been competed in step 184. The first server then, in step 186, determines whether or not to keep the transferred configuration parameter(s) after the transfer. Such determination may hinge upon whether or not the first server is continuing to run another workload that is associated with the same configuration parameter(s). Accordingly, the configuration parameters are either modified in step 188 or cleared in step 190. The workload itself may be transferred at any point after selecting the server that is the transfer target.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-volatile computer readable medium and non-transitory program instructions embodied therein, the program instructions being configured to be executable by a processor to cause the processor to perform operations comprising:

migrating a workload from a first server to a second server, wherein the first and second servers are within a management network;

transferring one or more parameters of a configuration from the first server to the second server, wherein the one or more parameters enable continued performance of the workload on the second server;

sending a transfer request from the first server to the second server; and waiting for the first server to receive a response from the second server prior to migrating the workload and transferring the one or more parameter.

2. The computer program product of claim 1, wherein the one or more parameters includes a virtual address.

3. The computer program product of claim 2, wherein the virtual address is an Ethernet media access control address or a fiber channel world wide name.

4. The computer program product of claim 1, wherein the first server sends the transfer request to the second server in response to detecting a predetermined condition.

5. The computer program product of claim 4, wherein the predetermined condition is a failover of the first server.

6. The computer program product of claim 1, the operations further comprising:

designating one or more servers, including the second server, within the management network as a candidate for receiving a workload from the first server;

sending a transfer request from the first server to the one or more servers;

receiving a response from at least one of the one or more servers; and selecting the second server from among the at least one of the one or more servers from which a response is received.

7. The computer program product of claim 6, wherein selecting the second server from among the at least one of the one or more servers from which a response is received, includes selecting a server associated with a first response to the transfer request.

8. The computer program product of claim 6, wherein the transfer request includes workload or priority requirement, and wherein selecting the second server from among the at least one of the one or more servers from which a response is received, includes selecting a server associated with a first response indicating that the responding server can satisfy the workload or priority requirement included in the transfer request.

9. The computer program product of claim 6, wherein selecting the second server from among the at least one of the one or more servers from which a response is received, includes selecting a server that is identified as being a member of a designated hardware group within the management network.

10. The computer program product of claim 6, the operations further comprising:

sending a digital signature in the transfer request for authenticating the first server by the second server.

11. The computer program product of claim 6, the operations further comprising:

causing the second server to apply the one or more parameter of the configuration; and receiving an acknowledgement from the second server that the one or more parameter of the configuration has been applied.

12. A computer program product comprising a non-volatile computer readable medium and non-transitory program instructions embodied therein, the program instructions being configured to be executable by a processor to cause the processor to perform operations, comprising:

migrating a workload from a first server to a second server, wherein the first and second servers are within a management network;

transferring one or more parameters of a configuration from the first server to the second server to enable continued performance of the workload on the second server, wherein the one or more parameters includes a storage adapter parameter for providing connectivity to a storage area network (SAN);

designating one or more servers within the management network as a candidate for receiving a workload from the first server;

sending a transfer request from the first server to the one or more servers;

receiving a response from at least one of the one or more servers; and sending the configuration to each of the servers from which a response is received.

13. The computer program product of claim 12, wherein migrating the workload and transferring the one or more parameters of the configuration occurs in response to workload fail over.

14. The computer program product of claim 12, the operations further comprising:

clearing the one or more parameters of the configuration from the first server in response to completing the transfer of the one or more parameters of the configuration to the second server.

15. A computer program product comprising a non-volatile computer readable medium and non-transitory program instructions embodied therein, the program instructions being configured to be executable by a processor to cause the processor to perform operations, comprising:

migrating a workload from a first server to a second server, wherein the first and second servers are within a management network;

transferring one or more parameters of a configuration from the first server to the second server to enable continued performance of the workload on the second server, wherein the one or more parameters includes a storage adapter parameter for providing connectivity to a storage area network (SAN); and storing a record of the configuration transfer in a configuration database of the first server, wherein the record identifies the second server and the one or more parameters that were transferred to the second server.

16. A computer program product comprising a non-volatile computer readable medium and non-transitory program instructions embodied therewith, the program instructions being configured to be executable by a processor to cause the processor to perform operations comprising:

designating one or more servers within the management network as a candidate for receiving a workload from a first server;

sending a transfer request from the first server to the one or more servers;

receiving a response from at least one of the one or more servers;

selecting a second server from among the at least one of the one or more servers from which a response is received;

migrating a workload from the first server to the second server, wherein the first and second servers are within a management network; and transferring one or more parameters of a configuration from the first server to the second server, wherein the one or more parameters enable continued performance of the workload on the second server.

17. The computer program product of claim 16, the operations further comprising:

sending a digital signature in the transfer request for authenticating the first server by the second server.

18. The computer program product of claim 16, wherein migrating the workload and transferring the one or more parameters of the configuration occurs in response to a workload failover.

19. The computer program product of claim 16, wherein the one or more parameters includes a virtual address.

20. The computer program product of claim 19, wherein the virtual address is an Ethernet media access control address or a fiber channel world wide name.

* * * * *